United States Patent [19]

Rohwetter et al.

[11] Patent Number: 5,443,149
[45] Date of Patent: Aug. 22, 1995

[54] APPARATUS FOR ALIGNING DISORDEREDLY SUPPLIED BODIES

[75] Inventors: Norbert Rohwetter; Jürgen Monka, both of Bünde, Germany

[73] Assignee: Werner Kammann Maschinenfabrik GmbH, Germany

[21] Appl. No.: 208,511

[22] Filed: Mar. 9, 1994

[30] Foreign Application Priority Data

Mar. 16, 1993 [DE] Germany .................. 43 08 316.1

[51] Int. Cl.⁶ .............................................. B65G 47/24
[52] U.S. Cl. ..................................................... 198/392
[58] Field of Search .......................................... 198/392

[56] References Cited

U.S. PATENT DOCUMENTS

| Re. 21,188 | 8/1939 | La Bounty . | |
|---|---|---|---|
| 1,085,774 | 2/1914 | Wegner . | |
| 3,119,487 | 1/1964 | Wyle et al. | 198/392 |
| 3,215,251 | 11/1965 | Gleason . | |
| 3,272,310 | 9/1966 | Blickisdorf et al. | 198/392 |
| 3,386,562 | 6/1968 | Miller | 198/392 |
| 3,788,449 | 1/1974 | Baberowski et al. . | |
| 3,952,858 | 4/1976 | Watts . | |
| 4,266,653 | 5/1981 | Mergl | 198/392 |
| 4,379,504 | 4/1983 | Salicini . | |
| 4,705,156 | 11/1987 | Boling | 198/392 |
| 4,832,175 | 5/1989 | MacIntyre | 198/392 |
| 4,921,106 | 5/1990 | Spatafora et al. | 198/392 X |
| 5,031,748 | 7/1991 | Bianchini et al. | 198/392 X |
| 5,065,852 | 11/1991 | Marti | 198/392 |
| 5,297,666 | 3/1994 | Marti Sala | 198/392 X |

FOREIGN PATENT DOCUMENTS

| 2539721 | 7/1984 | France . | |
|---|---|---|---|
| 491160 | 1/1930 | Germany . | |
| 1004539 | 3/1957 | Germany . | |
| 1271631 | 6/1968 | Germany . | |
| 1917175 | 10/1969 | Germany . | |
| 3402139 | 7/1984 | Germany . | |
| 8523951 | 10/1988 | Germany . | |
| 144446 | 12/1930 | Switzerland . | |
| 1283396 | 7/1972 | United Kingdom . | |
| 1347495 | 2/1974 | United Kingdom . | |
| 1579087 | 11/1980 | United Kingdom . | |
| 2231559 | 11/1990 | United Kingdom . | |
| 0603561 | 4/1978 | U.S.S.R. | 198/392 |
| 1294563 | 3/1987 | U.S.S.R. | 198/392 |

Primary Examiner—James R. Bidwell
Attorney, Agent, or Firm—Seidel Gonda Lavorgna & Monaco

[57] ABSTRACT

Apparatus for aligning bodies supplied in a disordered fashion has a drum defined at the underside by a bottom which comprises at least first and second disks or annular disks arranged one above the other. The outside diameter of a disk or annular disk is smaller than the outside diameter of the disk or annular disk disposed immediately therebeneath. The lowermost disk or annular disk forms the bottom boundary of a generally annular channel whose radially inward boundary is formed by the peripheral portion of the disk or annular disk disposed above the lowermost one, the bottom of the drum thus being of a stepped configuration. The bodies are introduced into the drum and pass outwardly into the channel within which the bodies are then aligned to be transported forwardly in succession therein, and are finally passed out of the drum.

24 Claims, 7 Drawing Sheets

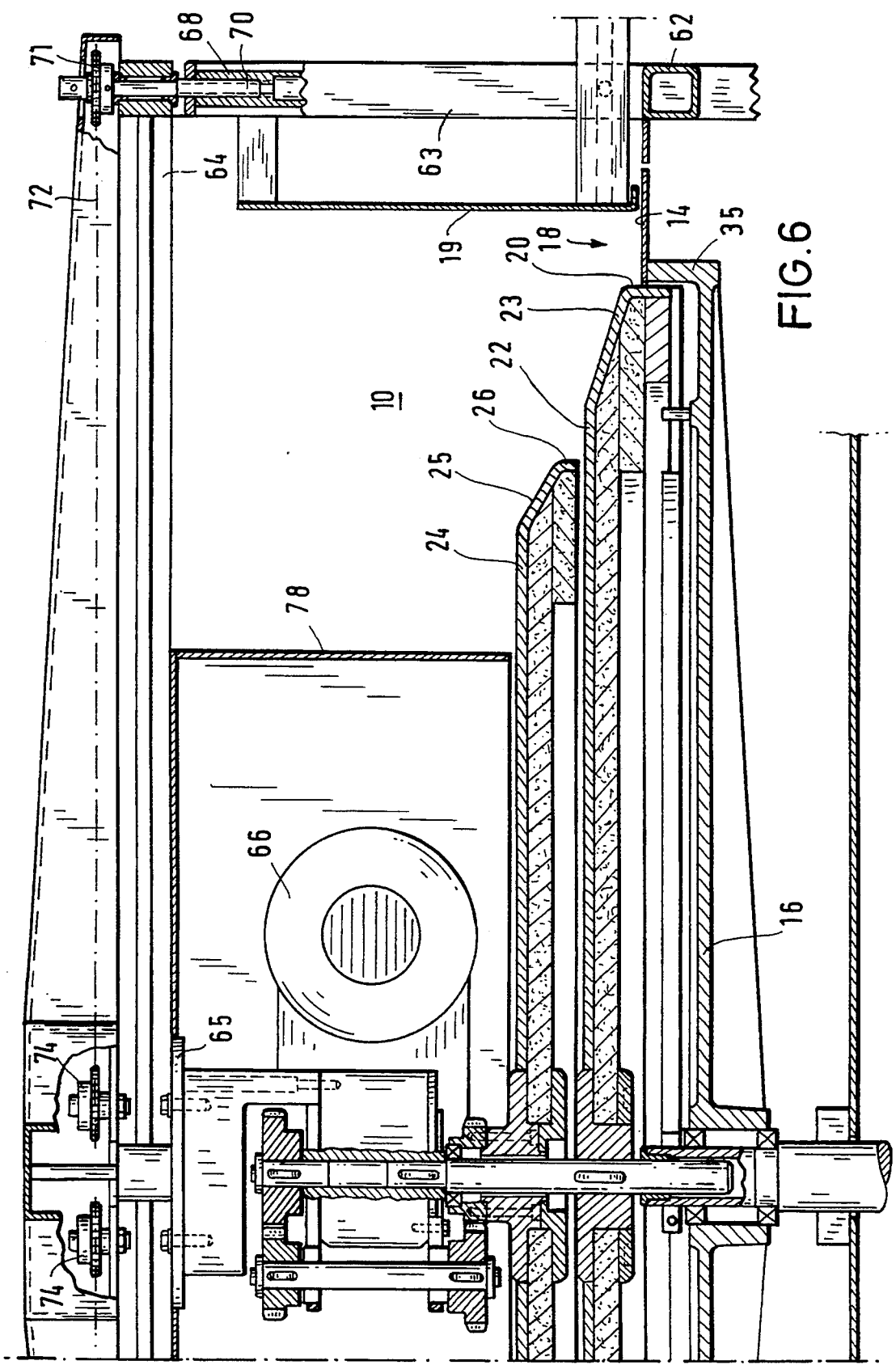

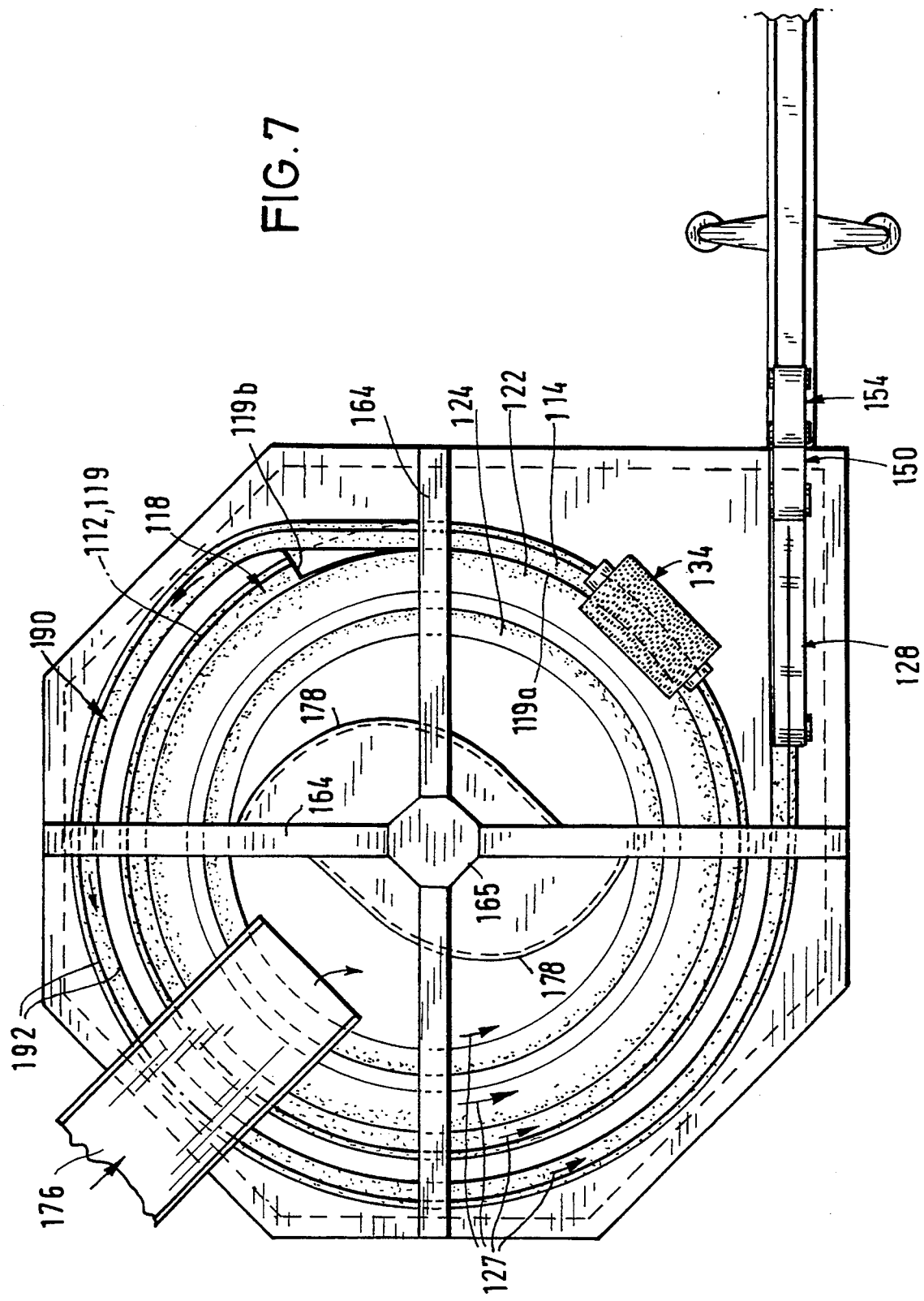

APPARATUS FOR ALIGNING DISORDEREDLY SUPPLIED BODIES

BACKGROUND OF THE INVENTION

A situation which may be encountered from time to time is where a plurality of bodies which are supplied in a disordered or random fashion have to be put into an orderly and aligned condition so that for example a further processing operation can be carried out thereon in a rational manner. The bodies involved for example may be hollow bodies of plastic material such as bottles, cups, beakers or the like, which are to be so ordered and aligned that, after passing through the apparatus for converting them from a disordered condition into an orderly condition, they are passed out of the apparatus disposed in a row one behind the other. In that respect the arrangement of the bodies, in regard to the positions of the ends thereof, relative to the direction of conveying movement is frequently random so that in the majority of cases an additional aligning operation also has to be carried out, in which those bodies which are in positions that are not suitable for subsequent handling and possible treatment are pivoted into a new position so that thereafter all bodies which are transported in a row are in a unitary position, including in regard to the positioning of the ends of the bodies.

Apparatuses for aligning bodies which are supplied in a disordered or random condition have to be suited to the dimensions and configuration of the respective bodies to be passed through the apparatus. At the present time apparatuses for that operation suffer from the disadvantage that, for that purpose, they use shaped members, that is to say some components which, when making a change from one series of bodies to another series of bodies of a different configuration and/or of different dimensions, have to be exchanged or adjusted, which is a time-consuming operation. That results in a considerable reduction in the level of productivity of such apparatuses. In addition in many cases their throughput capacity is anyway comparatively low.

SUMMARY OF THE INVENTION

An object of the present invention is so to design an apparatus for aligning disorderly supplied bodies such as hollow bodies of plastic material that disadvantages of prior apparatus are at least alleviated.

Another object of the present invention is to provide an apparatus for aligning disorderly supplied bodies which is of a simple design configuration and mode of operation and which can be matched to the respective bodies to be processed in a simple fashion and without involving a major expenditure of time.

Still another object of the present invention is to provide an apparatus for putting disorderly supplied bodies into an ordered condition which permits a high throughput capacity while nonetheless ensuring that the bodies are treated gently within the apparatus.

A still further object of the present invention is to provide an apparatus for orienting disorderly supplied bodies which is of a compact design configuration.

In accordance with the principles of the present invention the foregoing and other objects are achieved by an apparatus for aligning disorderly supplied bodies, such as hollow bodies of plastic material, comprising a drum which is defined at its underside by a bottom and which is rotatable about a substantially vertical axis. The bottom of the drum comprises at least first and second coaxial discoid means, more specifically disks or annular disks. The first and second discoid means are arranged one above the other and are rotatable independently of each other. The first discoid means in the lowermost position is of the largest outside diameter, and the second discoid means which is disposed thereabove, with at least a part of its outer periphery, forms the radially inward boundary of a channel whose bottom boundary is provided by the first discoid means. The radially outward boundary of the channel is formed by a stationary wall. The radial width of the channel, defined by the distance between the outer periphery of the second discoid means and the outer wall, is adapted to the configuration of the bodies to be aligned in such a way that only one such body can be accommodated by the channel over the width thereof. The apparatus further includes a stripper means which is disposed above the channel and which is operative to move away towards the interior of the drum bodies which are disposed in the region of the channel above a body in the channel, without however removing bodies which occupy their correct position within the channel. Downstream of the stripper means in the direction of transportation movement of the bodies a portion of the channel is delimited on the radially inward side thereof by a stationary wall portion which shields said part of the channel relative to the interior of the drum. The bodies in aligned positions are guided out of the drum by way of at least a part of the said shielded portion of the channel.

As will be seen in greater detail from the following description of a preferred embodiment of the invention, an apparatus in accordance with the invention is distinguished in particular by its simplicity of structure and its high throughput capacity. The arrangement of at least first and second disks or annular disks, referred to herein as discoid means, one above the other, in such a way that between the surfaces of the discoid means which carry the bodies there is a difference in level resulting in the formation of a step, results in the course of the movement of a body towards the outer wall or towards the channel defined thereby at the radially outward side of the channel, in the body assuming a position which, when the body reaches the channel and in particular when it encounters the outer wall thereof, promotes alignment and orientation of the body such that it can pass into the channel without major difficulty. That increases the throughput capacity of the apparatus. A further advantage of this arrangement is that the amount of noise generated within the apparatus is relatively low.

In accordance with a preferred feature of the invention three or possibly even more discoid means, namely disks or annular disks, can be arranged in stepped array one above the other, so that the bottom of the drum forms in a radially outward direction a kind of cascade configuration, over which the bodies pass outwardly into the region of the channel. Practical operation has shown that in the majority of cases optimum results can be achieved with a total of three disks or annular disks disposed one above the other.

As the periphery of the second disk or annular disk which is disposed above the lower disk or annular disk forms the inner boundary of the channel, vertical adjustment of the second disk or annular disk makes it easily possible to adapt the depth of the channel to the respective bodies to be aligned and oriented in the apparatus. The radial width of the channel can be adapted to the respective bodies by suitable adjustment of the drum wall, for which purpose the wall is subdivided into the appropriate peripheral regions.

It may be noted at this point that if the apparatus is followed by a handling device in which wrongly positioned bodies are turned, the turning operation can also be carried out quickly and in a trouble-free manner in order also to achieve a correspondingly high throughput capacity in the handling device.

Further objects, features and advantages of the present invention will be apparent from the following description of preferred embodiments.

BRIEF DESCRIPTION OF THE DRAWINGS

FIG. 6 is a view in section approximately corresponding to that shown in FIG. 3, illustrating additional parts of the apparatus, and FIG. 7 is a diagrammatic plan view of a second embodiment of the apparatus according to the invention.

DESCRIPTION OF PREFERRED EMBODIMENTS

Figure 1:
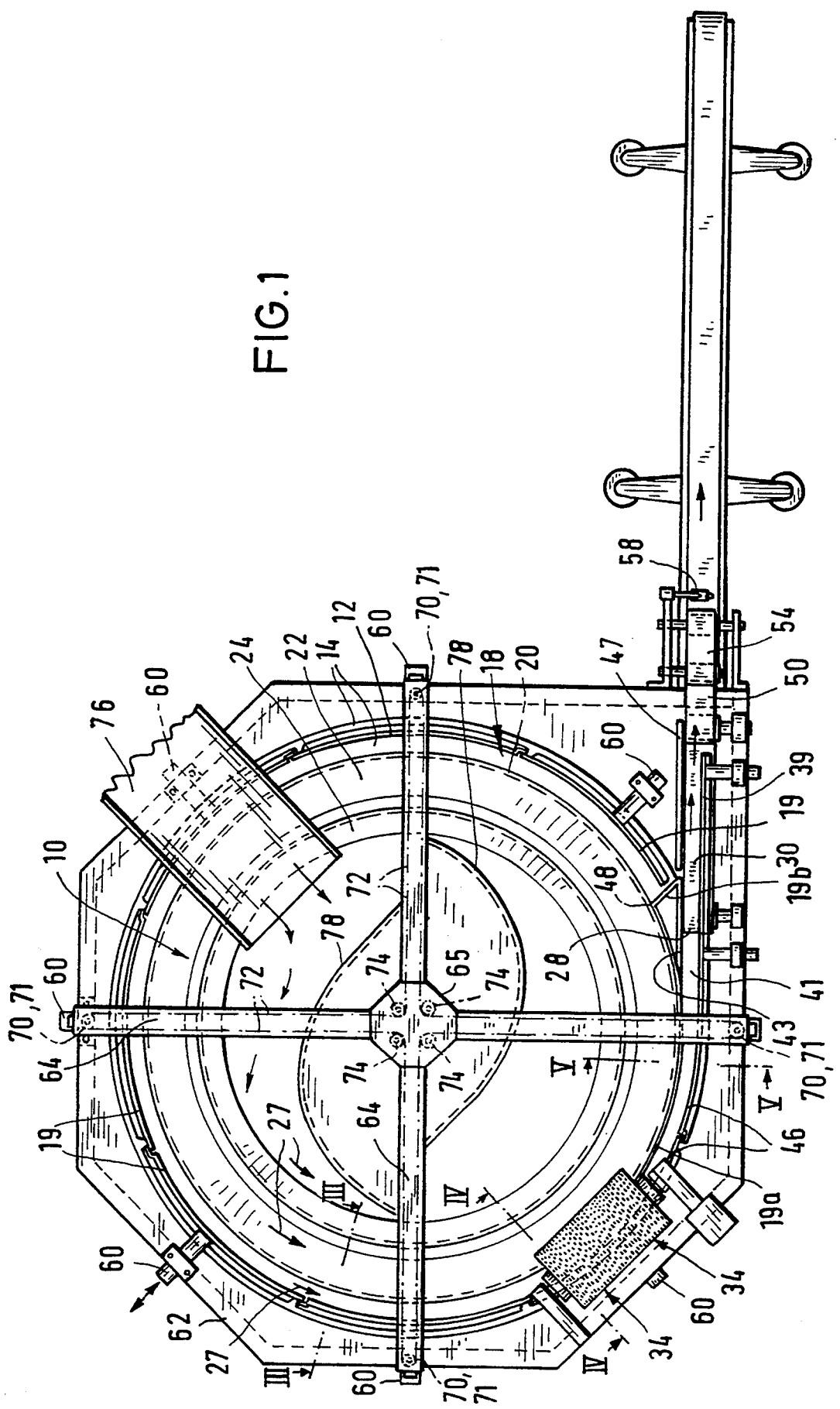
FIG. 1 is a plan view of an apparatus for aligning bodies which are supplied in a disordered fashion.

Referring firstly to FIGS. 1 through 6 the embodiment illustrated therein of an apparatus for aligning and orienting bodies which are supplied in a disordered or random condition, such as hollow bodies of plastic material, comprises a substantially round drum which is generally identified by reference numeral 10 and which is defined on the outside over the major part of its periphery by a vertical wall indicated at 12 in FIG. 1. The drum 10 is provided with first, second and third discoid means illustrated as annular disks 14, 22 and 24 which are arranged coaxially and one above the other and which form the bottom of the drum 10. The annular disks 14, 22 and 24 are mounted rotatably independently of each other about a common vertical axis. The outside diameters of the annular disks 14, 22 and 24 progressively decrease in a downward direction, as can be most clearly seen from FIG. 6. The first annular disk 14 which is the lowermost annular disk and which is carried by a rotatably mounted holder 16 of a wheel-like configuration forms the bottom of a channel 18 which extends over the major part of the periphery of the drum 10 within same and which is defined on its outside predominantly by wall portions 19 of the wall 12 and on the inside predominantly by a flange-like extension portion 20 of the second annular disk 22. The wall portions 19 and extension portion 20 can be clearly seen for example in FIGS. 3 and 6. The outer edge region 23 of the second annular disk 22 which is adjoined by the flange-like extension portion 20 is arranged inclinedly outwardly.

Arranged above the central or second annular disk 22 is a further third annular disk 24 whose outer edge region 25 also extends inclinedly outwardly and is provided with a downwardly facing flange-like peripherally extending extension portion 26 so that a step is also formed between the uppermost or third annular disk 24 and the second next lower annular disk 22. With its outer peripheral region the third annular disk 24 overlaps the inner peripheral region of the second annular disk 22, with the extension portion 26 terminating just above the annular disk 22 to form the step.

The three annular disks 14, 22 and 24 rotate about their common axis in the same direction as indicated by the arrows 27 in FIG. 1, but at different speeds in such a way that the speed of rotation thereof decreases in a downward direction, the annular disk 14 having a markedly lower speed of rotation than the others.

The channel 18 serves in a manner which will be described in detail hereinafter to align and orient the bodies which are supplied to the drum 10 in a disordered or random fashion, in such a way that within the channel, on leaving the drum, the bodies are arranged in a row one behind the other and are passed out of the drum 10 in that condition. For that purpose, disposed downstream of the drum 10 in the direction of conveying movement of the bodies is a conveyor belt indicated at 28 in FIGS. 1 and 5 and which has an upper portion 30 extending substantially tangentially relative to the channel 18 as shown in FIG. 1, to receive the bodies indicated at 32 in FIG. 4 in a lying position in the channel 18. FIG. 5 in particular shows the association of the conveyor belt 28 and more specifically the upper portion or run 30 thereof with the channel 18 and with the first annular disk 14 which defines the channel 18 at the bottom thereof.

The connection between the channel 18 and the conveyor belt 28 disposed downstream thereof is made in such a way that, as considered in the direction of rotation of the annular disks 14, 22 and 24, immediately downstream of stripper device 34 disposed above the channel 18, there begins a wall portion 19a of the wall 12, which shields or screens the channel 18 relative to the interior of the drum 10, in the peripheral region of the channel 18 between the stripper device 34 and a point at which the conveyor belt 28 adjoining the channel 18 is disposed outside the path of movement of the bottom of the channel 18 which is formed by the first annular disk 14. The wall portion 19a extends along the outer periphery of the second annular disk 22 between same and the inner boundary indicated at 49 in FIG. 5 of the first annular disk 14 and, in the region downstream of the stripper device 34 as considered in the direction of rotation 27, ensures that bodies which are disposed within the drum 10 and which are urged outwardly by centrifugal force due to the rotary movements of the annular disks 22 and 24 cannot pass into the portion of the channel 18 which is outside the drum 10, and thus into the transition to the adjoining conveyor belt 28. That ensures that only one layer of bodies which are disposed in a row is fed by the channel 18 to the upper portion 30 of the conveyor belt 28. FIG. 5 in particular shows that the wall portion 19a which is stationary and non-displaceable and which defines the channel 18 at the radially inward side thereof is carried by a stationary plate 37 mounted on a central support structure surrounding the shaft for driving the annular disk 22.

Looking now more specifically at FIG. 1, adjoining the end 48 of the wall portion 19a, which is remote from the stripper device 34 as considered in the direction of rotation 27, is a wall portion 19b which extends almost radially relative to the drum 10 and which provides the connection to the adjoining part of the wall 19 which again defines the channel 18 on the outward side thereof. Thus from the point 48 in the direction of rotation 27 to immediately downstream of the stripper device 34, that is to say as far as the beginning or upstream end of the wall portion 19a, the channel 18 is within the drum 10. On the outside the channel 18 is defined by the wall portions 19 of the wall 12 and in the region of the stripper device 34 by a guide bar which is shown at 46 in FIGS. 1 and 4. The guide bar 46 is then extended in the direction of transportation movement 27, downstream of the stripper device 34, towards the conveyor belt 28 where it meets the outwardly disposed guide bar indicated at 39 in FIGS. 1 and 5 of the upper portion or run 30 of the conveyor belt 28. The inward boundary of the transportation path 41 which joins to the channel 18 in the direction of the conveyor belt 28, as can be most clearly seen from FIG. 1, is formed by a guide wall 43 which extends between the wall portion 19a and the transversely extending wall portion 19b. Adjoining the guide wall 43 is a guide bar which is indicated at 47 and which is associated with the upper portion or run 30 of the conveyor belt 28.

Figure 2:
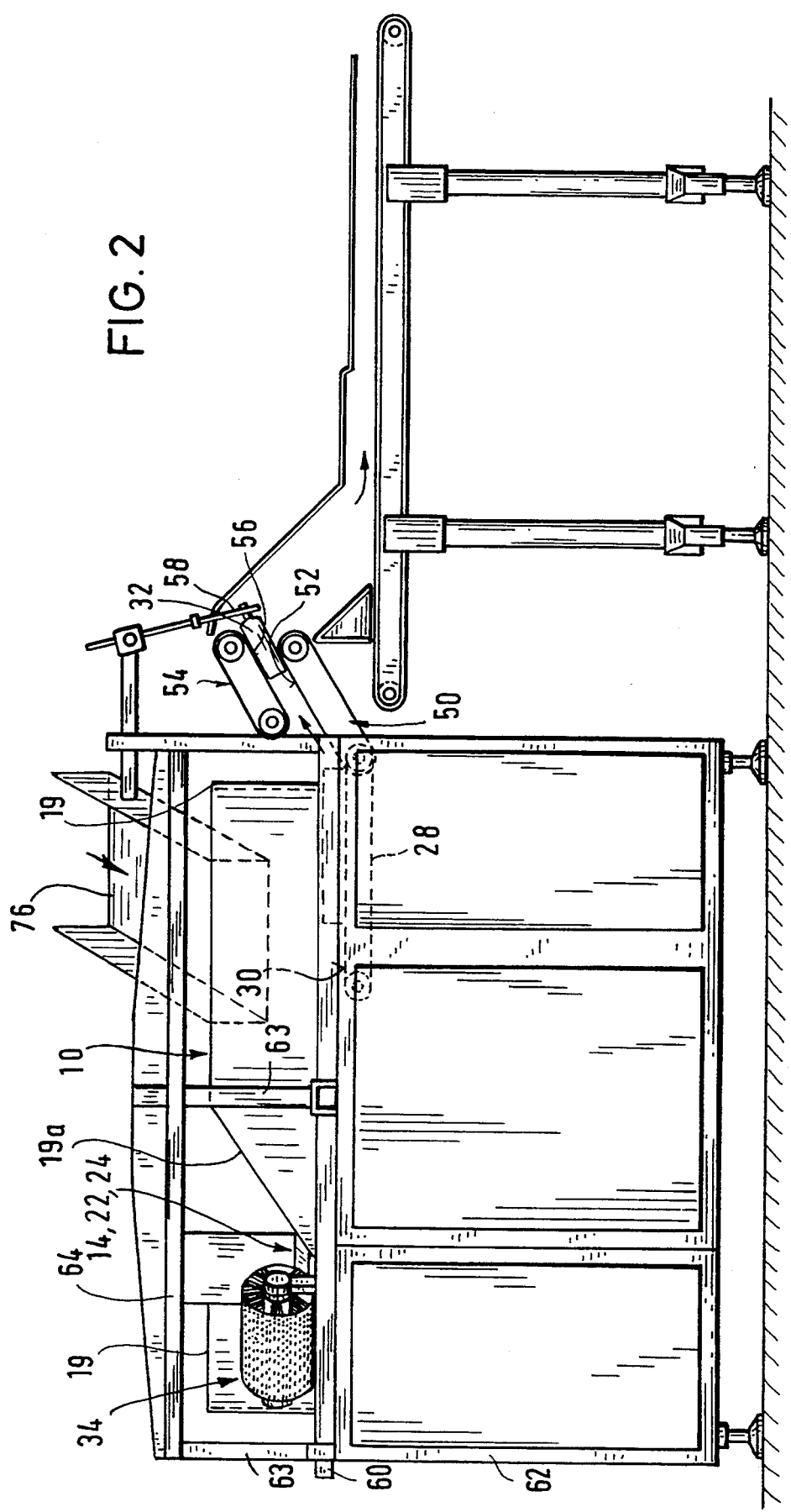
FIG. 2 is a side view of the FIG. 1 apparatus.
Figure 3:
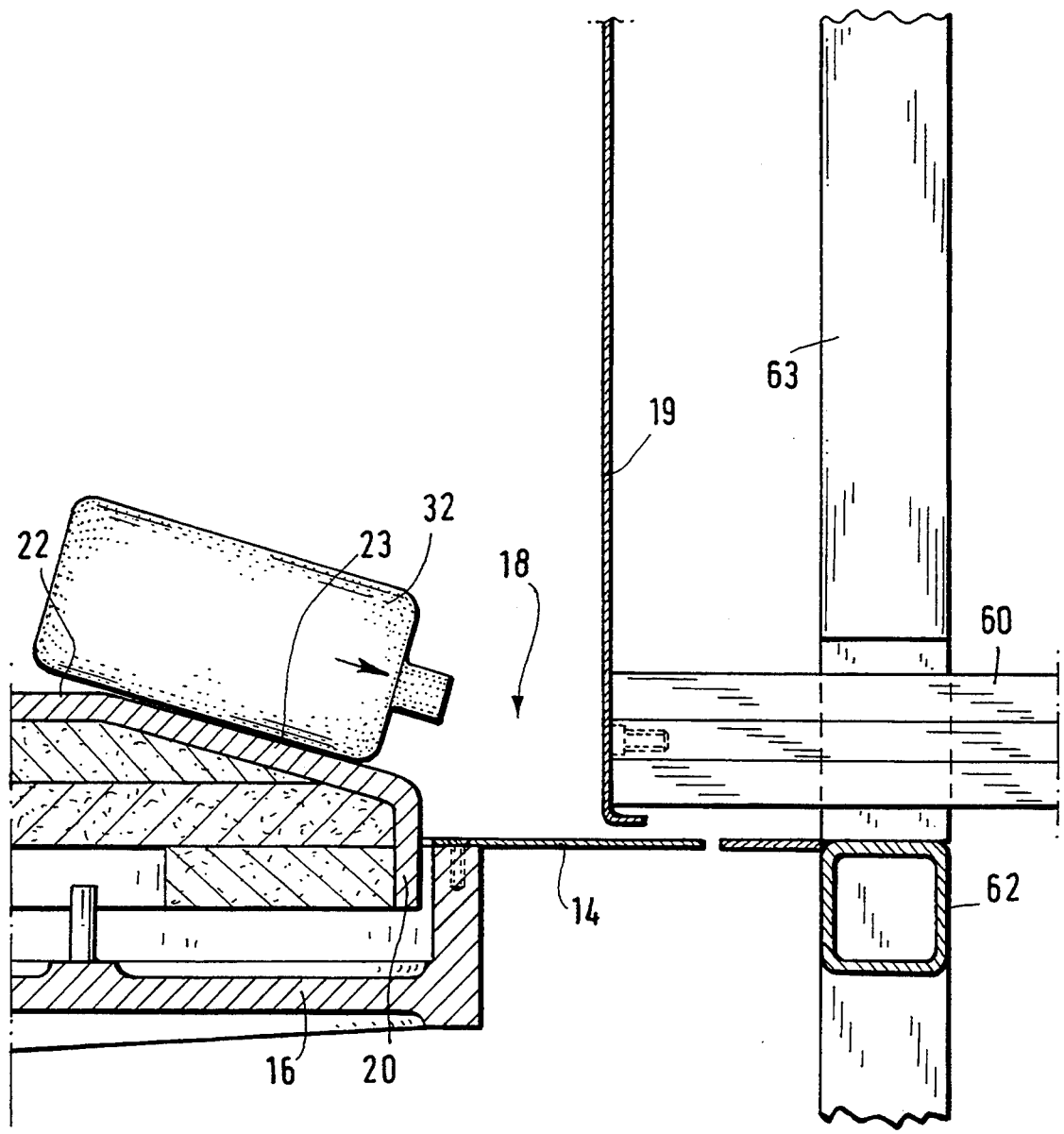
FIG. 3 is a view in section on line III—III in FIG. 1.
Figure 4:
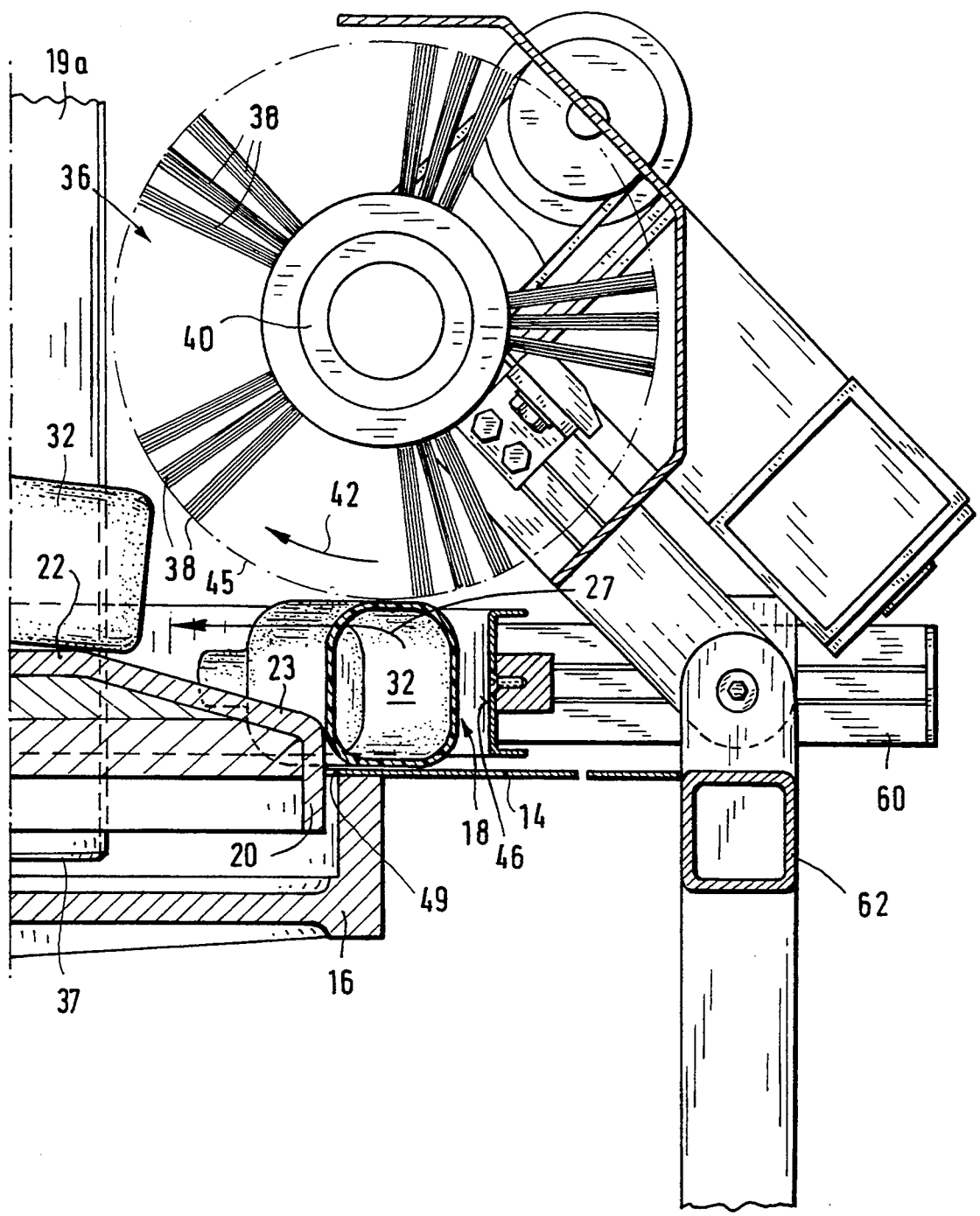
FIG. 4 is a view in section on line IV—IV in FIG. 1.
Figure 5:
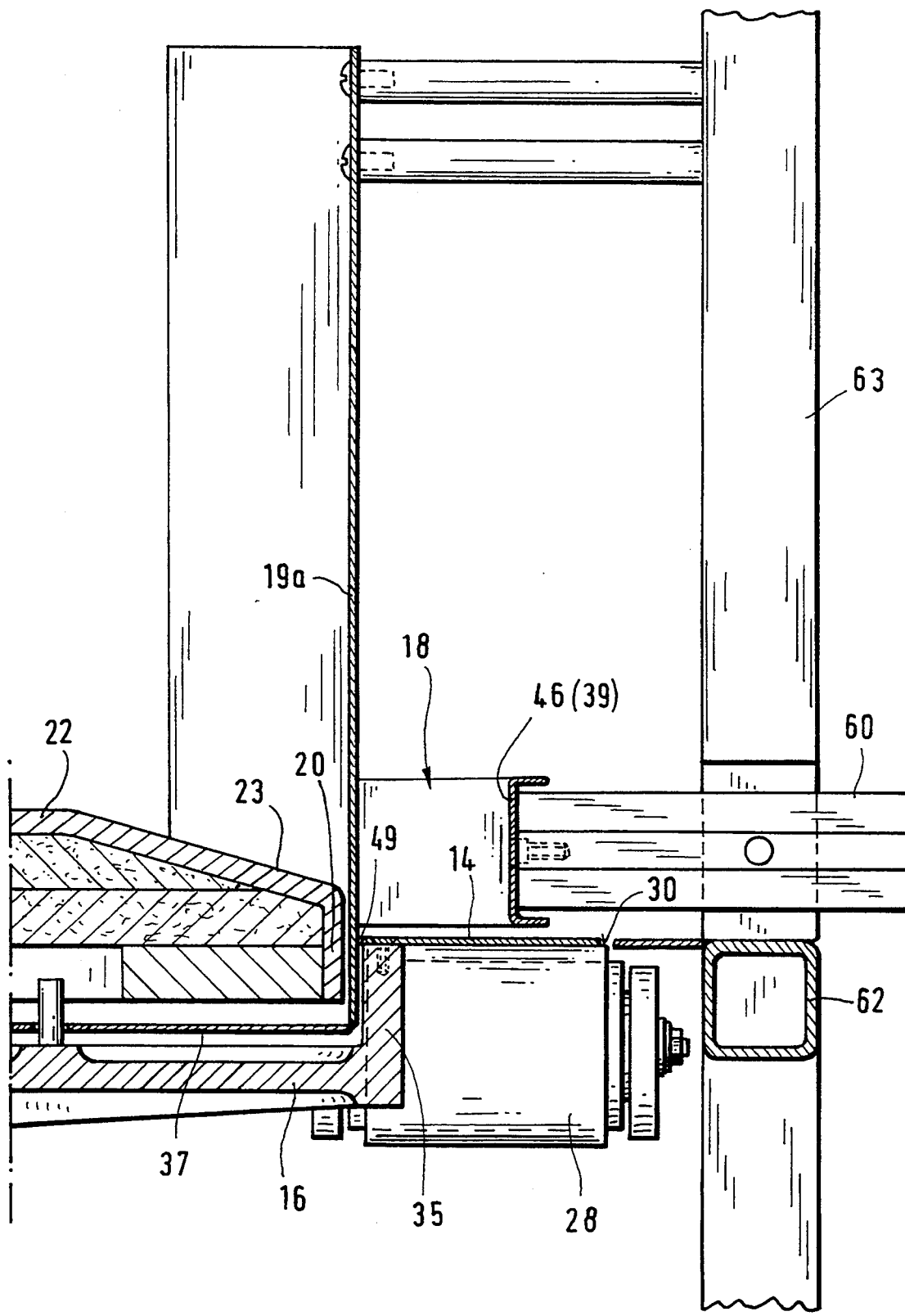
FIG. 5 is a view in section on line V—V in FIG. 1.

The above-mentioned stripper device 34 which is arranged above the channel 18 at approximately 45° of arc upstream of the transition from the channel 18 to the conveyor belt 28, relative to the direction of rotation 27 of the annular disks 14, 22 and 24, comprises a rotatable brush 36 as can be clearly seen from FIGS. 2 and 4. The brush 36 has a shaft 40 which carries bristles 38 and extends approximately tangentially relative to the channel 18 at such a spacing from the lowermost annular disk 14 that the lowermost point of the circular path indicated at 45 in FIG. 4, described by the free ends of the bristles 38, is just above a respective body 32 lying in the channel 18, as shown in FIG. 4. The above-described arrangement of the components means that the brush 36 which rotates in the direction indicated by the arrow 42 in FIG. 4 engages bodies 32 which are disposed in the region of the channel 18 above and/or on one of the bodies disposed in the channel 18, in the course of forward transportation movement thereof by the annular disk 14 and possibly also by the second annular disk 22, as soon as the bodies pass into the region of movement of the brush 36, and urges such bodies inwardly, that is to say substantially on to the second annular disk 22 so that, after the bodies pass the stripper device 34, in the region of the channel 18, there is only ever one layer of bodies which are arranged in a row in succession and consequently also there is only ever one layer of bodies that can pass into the channel 18 in the region thereof which, in the direction of rotation 27 of the annular disk 14, is disposed downstream of the stripper device 34, outside the drum 10. As the wall portion 19a ensures that downstream of the stripper device 34, as considered in the direction of transportation movement 27, as far as the end 48 of the wall portion 19a, bodies cannot pass out of the drum 10 again into the region of the channel 18 and the adjoining transportation path 41, the bodies are fed to the adjoining conveyor belt 28 in a row one behind the other and in a single layer.

The precise way in which the path of rotary movement of the ends of the bristles 38 of the brush 36 is arranged relative to the bodies 32 disposed in the channel similarly to the body 32 shown in FIG. 4, depends on the respective operating factors involved. It is thus possible for the bristles 38 to come into contact with a body in the channel 18. In that respect the height of the inner boundary of the channel 18, defined by the annular disk 22, may also play a part. The only crucial consideration is that a force which is possibly applied to the body 32 is not sufficient to urge a respective body which is already in the channel 18 out of same into the interior of the drum 10.

As the bodies 32 to be aligned are to be transferred to the belt conveyor 28 in a row, in addition to the above-described operating steps it is also necessary to ensure that there is only ever one body 32 in the channel 18, as considered over the width thereof. That means that the channel 18 is of a width, that is to say a radial dimension, which only affords space for accommodating one body 32. When dealing with a body of non-cylindrical cross-section, the width of the channel 18, that is to say its radial dimension, is to be matched to the smallest cross-sectional dimension of the body so that the body can only be accommodated by the channel 18 in a specific approximately upright position as most clearly shown in FIG. 4.

It is also necessary for the depth of the channel 18, that is to say the height of the lateral boundary afforded by the peripherally extending flange portion 20 of the second annular disk 22, to be so selected that the cross-section of the channel 18 is filled by a body disposed therein, to such an extent that a second body no longer has any space within the channel 18 beside a first body already lying on the annular disk 14, or, if the second body rests on the first body in the channel 18, the second body can be readily displaced by the stripper device 34 inwardly, that is to say towards the center of the drum 10. In general terms there is no need for the depth of the channel 18 to be approximately equal to the maximum vertical dimension of the cross-section of the body 32. On the contrary it can be seen from FIG. 4 that it is sufficient for the inward boundary of the channel 18 as defined by the second disk 22 or the flange-like extension portion 20 to be such that the peripheral edge of the annular disk 22 or the surface of the flange-like extension portion 20 acts as a kind of abutment which holds the body 32 within the channel 18, even under the action of any forces which are possibly applied to the body 32 by the stripper device 34. The depth of the channel 18 and the setting of the brush 36 relative to the channel substantially depend on the cross-sectional shapes of the respective bodies to be processed. The optimum settings can be ascertained by simple tests.

As the apparatus in accordance with the invention is to be usable for bodies of different dimensions and shapes, at any event within certain limits, the apparatus is so designed that it can be adapted to the respective bodies to be aligned, in a short time, by straightforward simple displacement and adjustment of some parts of the apparatus.

Adaptation of the radial width of the channel 18 to the shape and dimensions of the bodies 32 is effected by way of suitable adjustment of the wall portions 19 and the guide bar 46 shown in FIG. 4. For that purpose, in the region in which the channel 18 lies within the drum, the wall 12 of the drum 10 is subdivided for example into six wall portions 19, in addition to which there is also the guide bar 46 shown in FIG. 4. For the purposes of adjusting the radial width of the channel 18 the wall portions 19 and the guide bar 46 are displaced towards or away from the center point of the drum 10 and fixed in a position corresponding to the respectively desired width of the channel 18. As shown in FIGS. 1 and 2, the individual wall portions 19 and the guide bar 46 are each carried by respective profile portions 60 which are disposed substantially radially relative to the drum 10 and which are radially slidably mounted on the frame structure 62 of the apparatus. That arrangement includes clamping means, by which the profile portions 60 can be clamped fast on the frame structure 62 in their respective adjusted operative position. The consequence of that arrangement is that displacement of a wall portion 19 or the guide bar 46 by corresponding radial displacement of the associated profile portion 60 does not result in a uniform variation in the width of the channel 18, over the entire length of the wall portion 19 as considered in the direction of rotation 27, as precisely radial displacement occurs only in the region of the respective profile portion 60. In the other regions of the respective wall portion 19, the degree of the variation in the width of the channel 18 differs from the degree of variation in the region of the respective profile portion 60, that difference increasing with increasing distance from the profile portion 60 which carries the respective wall portion 19. In a practical context however those inaccuracies are minor and of no real significance as an advantage of the apparatus according to the invention is precisely that there is no need to set very high levels of requirement in terms of accuracy of adjustment of the component parts. The only crucial considerations are that the bodies 32 can pass unimpededly into the channel, in which case they automatically assume in terms of their cross-section the correct position within the channel 18, and that although the bodies are guided within the channel 18, they can however still move freely relative to all the elements which define the channel 18. The wall portions 19 are so arranged that they overlap each other somewhat in the direction of rotation 27, with the respective following wall portion 19 in the direction of rotation 27 overlapping the respectively preceding wall portion 19 on the outside thereof. That arrangement avoids the formation of projections and edges which could impede movement of the bodies 32 within the channel 18.

In order to be able to adjust the depth of the channel 18 which from a functional point of view is of significance only in regard to the inner boundary of the channel 18, the second and third annular disks 22 and 24 are mounted on the apparatus in such a way as to be adjustable in respect of height. For that purpose, as shown in FIG. 6, above the drum 10 the machine frame structure 62 is provided with two bearers 64 which extend substantially in a horizontal plane and which are disposed in a crossed configuration, as can be seen from FIG. 1. The bearers 64 are mounted with their ends on vertical supports indicated at 63 in FIG. 6, of the frame structure 62.

Referring still to FIGS. 1 and 6, mounted on the two bearers 64 in the region where they cross is a holder plate 65 mounting the drive motor 66 for the second and third annular disks 22 and 24, as well as the shafts and transmission elements required for transmission of the drive forces. Mounted in the upper region of each support 63 is a screwthreaded sleeve 68 into which engages a screwthreaded pin 70 which is rotatably mounted at the end of each bearer 64 supported by the respective support 63. As the screwthreaded pin 70 is in each case axially immovably connected to the respective bearer 64, rotary movement of the screwthreaded pin necessarily results in heightwise displacement and adjustment of the associated bearer 64 as each support 63 is part of the fixed apparatus frame structure 62. In order to provide for synchronous actuation of all four screwthreaded pins 70 of the two bearers 64, each of the screwthreaded pins 70 is provided with a gear or sprocket 71, while associated with the sprockets 71 of all the screwthreaded pins 70 is a common chain 72 which is guided within the bearers 64 which for that purpose are provided with direction-changing guide sprockets 74 in the region where the bearers 64 cross. Actuation of one of the sprockets 71 which for that purpose is provided with an actuation square portion necessarily results, by way of the chain 72, in a uniform upward or downward movement of all the bearers 64 and therewith the second and third annular disks 22 and 24 supported thereon.

The annular disk 14 is driven by way of a friction wheel (not shown) co-operating with the flange portion 35 of the holder 16. The drive for the friction wheel can be derived from the drive for the conveyor belt 28 which is arranged downstream of the channel 18, thereby also providing for synchronization of those conveyor means.

The vertical extent of the flange portion 20 of the second annular disk 22 which forms the inner boundary of the channel 18 must be so selected that, when the second annular disk 22 is in the position of being displaced furthest upwardly, the channel 18 is of a depth which, with the body disposed in the channel 18, determines the largest maximum cross-sectional dimension that a body may have in order still to be capable of being processed in the apparatus. The extent by which the second annular disk 22 can be lowered is determined by the height of the flange portion 35 at the outer periphery of the wheel-like holder 16 for the annular disk 14, and the position of the stationary plate 37 which carries the wall portion 19a. The annular disk 14 is fixed to the upwardly directed flange-like extension portion 35, as can be clearly seen from FIG. 5.

It will be seen from the above-described interrelationships that, for the purposes of adaptation to different cross-sectional shapes in respect of the bodies 32 and to the depth of the channel 18, that is to say to the height of the inner boundary thereof, the heightwise position of the stripper device 34 must also be adjustable in order to comply with the above-mentioned condition that bodies 32 which are correctly positioned in the channel 18 are not moved out of the channel 18 by the stripper device 34, while on the other hand a body disposed above the channel 18 or lying on a body 32 already disposed in the channel 18 is satisfactorily engaged in every case by the stripper device 34 and moved out of the region of the channel 18. To provide for such adjustability of the stripper device 34, it is mounted pivotably on the apparatus frame structure 62, by a pivoting lever arrangement that is clearly visible in FIG. 4.

The bodies 32 to be sorted which, as indicated above, in the majority of cases involve containers or the like of thermoplastic material, are passed into the drum 10 in a disordered arrangement. A feed conveyor means generally indicated at 76 can be provided for that purpose. The bodies 32 involved in the illustrated embodiment are in the form of bottles having a main bottle portion of generally rectangular cross-sectional shape and a neck portion thereon, and such bodies will therefore be referred to hereinafter as bottles, without however that being intended to denote a limitation to bottles. The bottles thus fall from the transportation means 76 predominantly on to the uppermost annular disk 24, as will be seen from the positioning of the radially inward end of the transportation means 76, shown in FIG. 1, above the annular disk 24. As a result of the rotary movement of the annular disk 24 and the rotary movement of the next lower annular disk 22, the bottles are moved outwardly towards the wall portions which form the boundary of the drum 10. As that happens the bottles are aligned in such a way that, in the region of the channel 18, they occupy a position in which their longitudinal axis extends at least substantially parallel to the respective tangent. The above-described aligning operation is assisted by the inclined end regions 23 and 25 respectively of the annular disks 22 and 24. A further contribution to the aligning effect is due to the fact that the transition from the upper annular disk to the respective next lower annular disk is by way of a step formed by the respective extension portions 26 and 20, and also leads to the abovedescribed effect, in conjunction with the rotary motion of the two annular disks 22 and 24 respectively.

The last phase of a bottle aligning operation will frequently take place in the region of the channel 18, due to the relative movement between the periphery of the second annular disk 22, the bottle and the fixed outer wall 12. In that situation the bottle will fall into the channel 18 and thus on to the annular disk 14 when there is no bottle in the channel 18 at that location, and in the course of the rotary movement of the annular disk 14 and possibly also the second annular disk 22, the bottle is transported towards the conveyor belt 28 which is disposed downstream of the channel 18. When the channel 18 is entirely filled with such bottles which then bear against each other with their respective ends, those bottles would then form within the channel 18 a circular array in the manner of a polygon, the number of bottles which can be accommodated by the channel 18 at a maximum depending on the length of the bottles. It will also be seen therefrom that the radial extent of the channel 18, that is to say the width thereof, depends on the length of the bottles in such a way that the width of the channel must also increase, with increasing bottle length. Theoretically, if a bottle is not of a highly irregular shape, a bottle in the channel 18 will bear at three points against the side walls defining the channel 18, more specifically, with both end regions of the bottle against the outer boundary of the channel and in the middle region of the bottle against the inner boundary of the channel, that is to say against the extension portion 20 of the second annular disk 22. In that respect the length of the bottle will generally have to be greater than its maximum cross-sectional dimension as otherwise there would be no guarantee that the bottle occupies the correct position in the channel 18, in which the longitudinal axis of the bottle extends substantially parallel to the respective tangent to the channel 18, in the manner already indicated above. The relationship between length and maximum cross-sectional dimension of the bottle should normally be at least 1.5:1.

Bottles which are in a position above a bottle already occupying the correct position in the channel 18 are also transported more or less uniformly and in the same fashion in the direction of rotation 27, but before the point at which the channel 18 extends outside the drum 10 in the region of the wall portion 19a, such bottles are removed by the stripper device 34 in the above-described manner and urged inwardly back into the interior of the drum 10. As shown in FIG. 1, the drum 10 is provided in its interior with guide plates 78 which in the view shown in FIG. 6 extend vertically while in the view shown in FIG. 1 they extend in an arcuate configuration. The guide plates 78 perform the function of a housing for the drive and transmission members which are carried by the holder plate 65 and which project downwardly into the region of the drum 10. On the other hand however as can be seen in particular from FIG. 1, the guide plates 78 are of such a configuration, being arcuate as indicated above, and they are so arranged, that the space available between the respective guide plates 78 and the oppositely disposed wall portions progressively decreases in size in the direction of rotation 27, with the result that the bottles are also urged outwardly towards the channel 18 by the guide plates 78.

Because the second annular disk 22 rotates at a higher speed than the annular disk 14 which defines the bottom of the channel 18, the bottles disposed in the channel 18 are also additionally accelerated, with the result that they are advanced relative to the annular disk 14, in the direction of rotation 27. The result of this is that the bottles normally pass on to the belt conveyor 28 in immediate succession, that is to say with their ends bearing against each other.

As, in consideration of handling devices which are disposed downstream of the conveyor belt 28, it may be necessary for the bottles to be fed individually and therefore at spacings to the handling devices, the conveyor belt 28 will generally operate at a speed which is greater than the speed at which the outer annular disk 14 rotates. As they are further transported, the bottles are subjected to an aligning effect in such a way that the ends of all bottles assume the same relative position; in other words, the neck which is generally provided on each bottle will face in the same direction, in respect of all bottles. In order to achieve that effect, disposed downstream of the conveyor belt 28 is a further conveyor belt indicated at 50 in FIGS. 1 and 2. As can be clearly seen from FIG. 2 the conveyor belt 50 is arranged at an angle relative to the horizontal in such a way that the bottles which are received by the upper portion or run 52 of the second conveyor belt 50 are transported inclinedly upwardly away from the horizontal conveyor belt 28. Associated with the second conveyor belt 50 is a third conveyor belt 54 which is arranged above the second conveyor belt 50 at such a spacing from the upper portion or run 52 thereof that the lower portion or run 56 of the third conveyor belt 54 bears against the top side of a respective bottle disposed on the conveyor belt 50 and thus presses the bottle against the upper portion or run 52 of the second conveyor belt 50, whereby the bottle is clamped between the second and third conveyor belts 50 and 54. That clamping effect provides for positive guidance of the bottle so as to ensure that the bottle is transported in a trouble-free manner, irrespective of the inclined positioning of the two conveyor belts 50 and 54. It may be noted here that the two conveyor belts 50 and 54, like also the conveyor belt 28, may in any case each comprise a belt having a structured surface for increasing the friction between the bottle and the respective belt. In addition the above-mentioned positive guidance effect for the bottles in the region of the two conveyor belts 50 and 54 is also advantageous for the reason that the transportation operation, including the rotary movements of the annular disks 14, 22 and 24 in the drum 10, is frequently interrupted at any event when the throughput capacity of the above-described apparatus is greater than the throughput capacity of any machines and items of equipment disposed downstream of the above-described apparatus. Positive guidance for the bottles in the region of the conveyor belts 50 and 52 guarantees that, even in the event of interruptions in the transportation procedure, that is to say when the belt conveyors and possibly also the annular disks 14, 22 and 24 forming the bottom of the drum 10 are switched off, any bottles disposed in the region of the two conveyor belts 50 and 54 remain in position in any case, more specifically even when for example a bottle which is still held by the co-operation of the conveyor belts 50 and 54 is already projecting beyond the two conveyor belts 50 and 54, with the portion of the bottle which leads in the direction of transportation movement, so that that leading portion of the respective bottle is disposed in the region of a loop member 58 as is shown in FIGS. 1 and 2 and the function of which will be described below. The consequence of the fact that a bottle in such a position is still clamped with its trailing portion between the conveyor belts 50 and 54 is that that bottle remains in that position until the conveyor belts 50 and 54 start up again. Accordingly, the operating conditions prevailing in this inclinedly upwardly extending path of conveying movement in the region of the conveyor belts 50 and 54, in respect of the positions adopted by the bottles, are always clearly defined.

At the end of the above-mentioned inclinedly upwardly directed path of conveying movement defined by the conveyor belts 50 and 54 is the above-mentioned loop member 58 which projects into the path of movement of the bottle as it leaves the conveyor belts 50 and 54, in such a way that, as shown in FIG. 2, when the neck portion of the bottle leads in the direction of transportation movement thereof, the neck portion passes into the loop member 58 with the result that the bottle is engaged thereby and, in the course of further transportation movement, the bottle is thus pivoted about the point of engagement of the neck portion of the bottle by the loop member 58, in such a way that the neck portion of the bottle faces rearwardly and the bottom of the bottle which was the trailing end of the bottle in the direction of transportation movement prior to the pivotal motion produced by the action of the loop member 58 is the leading end of the bottle in the direction of transportation movement, after such pivotal motion. The inclinedly upwardly directed path of the conveyor belts 50 and 54 is also advantageous in terms of the above-mentioned pivotal movement of the bottle as by virtue thereof the bottle, at the beginning of the pivotal movement, is already in an inclined position which reduces the length of the pivotal motion which has still to be produced by the action of the loop member 58. That is of benefit in regard to productivity of the apparatus, especially as the pivotal movement of the bottle will in any case take longer, with an increasing bottle length. That aspect can be compensated by the steepness of the conveyor belts 50 and 54 being increased in proportion to increasing length of the bottles, in order in that way to achieve a corresponding reduction in the length of the pivotal movement. Finally the inclined conveyor belts 50 and 54 also serve to maintain the height required for transportation of the bottles, subsequently to the pivotal movement thereof. In general the height at which the bottles are subjected to further transportation movement after passing the loop member 58 is determined by subsequent machinery for processing and handling the bottles. By virtue of the conveyor belts 50 and 54 extending inclinedly upwardly, it is possible also to take account of different bottle lengths in that respect. With increasing bottle length, the conveyor belts 50 and 54 are set at a steeper angle, with the result that the loop member has to be arranged at a correspondingly higher position. That in turn results in a larger free space beneath the loop member for carrying out the pivotal movement.

Bottles which are already transported through the two conveyor belts 50 and 54 with the neck portion trailing in the direction of transportation movement are not subjected to any pivotal motion at the loop member 58 as the loop member 58 is too small for the bottom end of the bottle, being of larger diameter than the neck portion, to be able to come into engagement with the loop member 58. An arrangement of this kind for producing unitary alignment of bottles in terms of the respective ends thereof is known and therefore does not need to be described in greater detail herein. When dealing with hollow bodies such as containers of a cup-like configuration, which have a larger opening at one end, the arrangement, instead of having a loop member as at 58, will generally use for example a hook member which is operable to engage into the opening of the hollow body to produce the appropriate pivotal movement thereof.

The relationships between the speeds of rotation of the first, second and third annular disks 14, 22 and 24 may be about 0.75: 1.0: 1.5, with the drum 10 being of a diameter of for example 1.5 m. The speed of rotation of the lowermost annular disk 14 may be for example between about 2 rpm and 10 rpm.

In general the speed at which the bodies or bottles are advanced in the channel 18 will not be substantially less than the peripheral speed of the annular disk 14 in the region of the channel 18. Moreover to avoid unacceptable stresses on the bodies, in particular due to friction, the wall 12 on its inward side and possibly also the two annular disks 22 and 24, in the region in which they come into contact with the body or bottle, may be provided with a soft shock-absorbing covering of for example textile material or the like.

Referring now to FIG. 7, the embodiment of the apparatus according to the invention as illustrated therein is the same in all essential details as the embodiment shown in FIGS. 1 through 6 so that the same components are denoted by the same references but increased in each case by 100. The only difference that falls to be considered here is that the channel 118 which at its outward side is defined predominantly by the wall 112 passes into a second channel 190 downstream of the bottle stripper device 134 as considered in the direction of rotation of the annular disks. The second channel 190 is defined on respective sides by guide means 192 and at the underside by the first annular disk 114 which for that purpose is of a suitable outside diameter and which also defines the underside of the first channel 118 which extends predominantly within the drum 110. Consequently the wall portion 119a which defines the channel 118 at the inward side thereof immediately following the bottle stripper device 134 in the direction of rotation 127 leads into the second channel 190 which extends outside the drum 110. The wall portion 119a performs the same function as in the case of the embodiment shown in FIGS. 1 through 6, namely it shields the portion of the channel 190 which immediately adjoins the stripper device 134, relative to the bodies which are still disposed in the drum 110. Accordingly the transverse wall portion 119b also extends between the wall portion 119a and the guide means 192 which defines the inward side of the outer channel 190. At least the outer guide means 192 which will be generally of a bar-like configuration similarly to the member indicated at 46 in FIG. 4 can be divided up into portions, similarly to the wall portions of the drum 110; the portions of the outer guide means 192 can be mounted adjustably for adaptation to the dimensions of the bodies to be passed through the arrangement.

In a departure from the above-described configuration, the channel 190 can also be defined at its underside by an additional conveyor means, for example a further annular disk, a curved belt or the like, which is independent of the first annular disk 114.

The outer channel 190 then feeds to the conveyor belt 128 which passes the bodies transported thereto in a condition of lying in a row to the two inclinedly upwardly extending conveyor belts 150 and 154 which are associated with a loop member (not shown) corresponding to the loop member 58 of the embodiment shown in FIGS. 1 through 6.

The advantage of the embodiment of FIG. 7 is that the outer channel 190 affords additional storage capacity for bodies which have already been aligned, without linear transportation paths being required for that purpose. On the contrary the entire apparatus will only be of a somewhat larger diameter which however is scarcely significant having regard to the fact that the apparatus is in any case of a compact overall structure.

It will be seen from the foregoing therefore that the apparatus according to the invention is of a simple structure and can be adapted to the respective bodies to be passed therethrough in a simple fashion and thus without involving a great deal of time. The apparatus can nonetheless provide a high throughput capacity and ensure that the bodies being processed thereby are treated carefully within the apparatus. If the apparatus is followed by a handling device in which wrongly positioned bodies are to be turned, that operation can also be carried out quickly and in a trouble-free manner so that a correspondingly high throughput capacity can also be achieved in the handling device.

It will be appreciated that the above-described embodiments of the apparatus according to the invention have been set forth solely by way of example and illustration of the principles of the present invention and that various modifications and alterations may be made therein without thereby departing from the spirit and scope of the invention.

What is claimed is:

1. An apparatus for aligning disorderedly supplied bodies including: a drum which is rotatable about a substantially vertical axis and which has a bottom comprising at least first and second substantially coaxial discoid means arranged one above the other, the first discoid means at the lowermost position being of the largest outside diameter, the second discoid means being disposed above and being of smaller diameter than the first discoid means, the second discoid means having at least a part of its outer periphery forming an inner boundary of a channel for receiving the supplied bodies in alignment, the first discoid means forming a bottom boundary of said channel; a stationary wall means forming the outer boundary of said channel, wherein the radial width of the channel which is defined by the distance between said outer periphery of said second discoid means and said stationary wall means, is adapted to the configuration of the supplied bodies to be aligned in such a way that only one body can be accommodated by the channel over the width of the channel; means for rotating each discoid means independently of each other; means for adjusting the position of the second discoid means to provide for adjustment of the height of the inner boundary of said channel which is formed by the outer periphery of the second discoid means, the height adjustment being dependent on the size and configuration of the supplied bodies; a stripper means disposed above said channel and operative to urge towards the interior of the drum any body disposed in the region above a body within the channel, without however removing bodies which occupy their correct position within the channel; and second stationary wall means located downstream of said stripper means in the direction of transportation of said bodies in said channel, the second stationary wall means delimiting a portion of said channel on the inward side thereof to shield said portion of the channel relative to the interior of the drum, whereby the aligned bodies in the channel are guided out of the drum by way of at least a part of said shielded portion of the channel.

2. Apparatus as set forth in claim 1 wherein each said discoid means comprises a disk.

3. Apparatus as set forth in claim 1 wherein each said discoid means comprises an annular disk.

4. Apparatus as set forth in claim 1 wherein the outer periphery of the second discoid means has a downwardly directed flange-like extension portion which extends at least substantially parallel to the axis of rotation of the discoid means thereby to delimit the channel in an inward direction.

5. Apparatus as set forth in claim 1 wherein the outer edge region of the top side of the second discoid means extends inclinedly downwardly.

6. Apparatus as set forth in claim 1 including means for rotation of the discoid means in the same direction at speeds of rotation such that the speed of a respective discoid means is greater than that of the respective discoid means immediately therebeneath.

7. Apparatus as set forth in claim 3 including means for rotation of the discoid means in the same direction at speeds of rotation such that the speed of a respective discoid means is greater than that of the respective discoid means disposed immediately therebeneath.

8. Apparatus as set forth in claim 1 and further including: a second channel which is arranged on the outside of and substantially coaxially with the first-mentioned channel, said second channel forming a continuation of said first channel for receiving bodies therefrom; a discoid means defining said second channel downwardly; means for rotation of said further discoid means in the body-transportation direction; and stationary guide portions defining said channel at the inward and outward sides.

9. Apparatus as set forth in claim 8 wherein said discoid means forming the underside boundary of the second channel is said first discoid means which also forms the underside boundary of the first channel.

10. Apparatus as set forth in claim 1 wherein the stripper means comprises a rotatable brush means having an axis of rotation at least approximately tangential relative to a circle defined by the channel, the path of movement of the free ends of the bristles forming the brush means extending in such a way that a body disposed in the correct position in the channel is not removed by the stripper means.

11. Apparatus as set forth in claim 1 including means for adjusting the stripper means in respect of its spacing from the channel.

12. Apparatus as set forth in claim 1 and further including a conveyor means for receiving the aligned bodies from the channel, the conveyor means adjoining said channel portion which is shielded from the drum interior by said stationary wall means.

13. Apparatus as set forth in claim 12 wherein said conveyor means for receiving the aligned bodies is a belt conveyor which approximately tangentially adjoins the channel.

14. Apparatus as set forth in claim 1 wherein the first discoid means is an annular disk of an inside diameter which is smaller than the outside diameter of the second discoid means and is so arranged that there is a space along its inward periphery for receiving the periphery of the second discoid means.

15. Apparatus as set forth in claim 1 and further including pivotably mounted means operatively associated with the path of transportation movement followed by the bodies after leaving the drum and adapted to pivot said bodies, said pivoting means projecting into said path of movement to come into engagement with a respective body in dependence on the nature of the end of the body which is at the leading end thereof in the direction of its transportation movement thereby to produce a pivotal movement of said body in such a way that after said pivotal movement said body occupies a position in which its end which was the trailing end in the direction of transportation movement thereof prior to its pivotal movement becomes the leading end in the direction of transportation movement thereof.

16. Apparatus as set forth in claim 15 wherein said path of transportation movement includes an upwardly extending portion and said pivoting means is disposed at the end of said upwardly extending portion of said path of transportation movement.

17. Apparatus as set forth in claim 16 wherein said upwardly extending portion of the path of transportation movement is formed by first and second belt conveyors which are arranged in superposed relationship in such a way that a body to be transported is clamped between mutually facing portions of the belt conveyors.

18. An apparatus for aligning disorderedly supplied bodies comprising: a drum which is rotatable about a substantially vertical axis and which has a bottom comprising at least first, second, and third substantially coaxial discoid means arranged one above the other, the first discoid means at the lowermost position being of the largest outside diameter, the second discoid means being disposed thereabove and being of smaller diameter than same, the third discoid means being of an outside diameter which is smaller than that of the second discoid means, the second discoid means having at least a part of its outer periphery forming an inner boundary of a channel for receiving the supplied bodies in alignment, the first discoid means forming a bottom boundary of said channel; a stationary wall means forming the outer boundary of said channel, wherein the radial width of the channel, which is defined by the distance between said outer periphery of said second discoid means and said stationary wall means, is adapted to the configuration of the supplied bodies to be aligned in such a way that only one body can be accommodated by the channel over the width of the channel; means for rotating each discoid means independently of each other; a stripper means disposed above said channel and operative to urge towards the interior of the drum any body disposed in the region above a body within the channel, without however removing bodies which occupy their correct position within the channel; and second stationary wall means located downstream of said stripper means in the direction of transportation of said bodies in said channel, the second stationary wall means delimiting a portion of said channel on the inward side thereof to shield said portion of the channel relative to the interior of the drum, whereby the aligned bodies in the channel are guided out of the drum by way of at least a part of said shielded portion of the channel.

19. Apparatus as set forth in claim 18 wherein the outer edge region of the top side of the third discoid means extends inclinedly downwardly.

20. Apparatus as set forth in claim 18 wherein the top side of the third discoid means is disposed with its outer periphery at a spacing from the subjacent top side of the second discoid means.

21. Apparatus as set forth in claim 20 wherein the third discoid means is provided at its outer periphery with a downwardly extending flange-like extension portion.

22. Apparatus asset forth in claim 18 including means for adjusting the second discoid means in respect of its heightwise position in order thereby to provide for adjustment of the height of the inner boundary of said channel which is formed by the outer periphery of the second discoid means, in dependence on the size and configuration of said bodies, and further including means for adjusting the third discoid means in respect of its heightwise position in a manner corresponding to the second discoid means.

23. Apparatus as set forth in claim 22 and further including a common holding means for carrying the second and third discoid means.

24. An apparatus for aligning disorderedly supplied bodies comprising: a drum which is rotatable about a substantially vertical axis and which has a bottom comprising at least first and second substantially coaxial discoid means arranged one above the other, the first discoid means at the lowermost position being of the largest outside diameter, the second discoid means being disposed thereabove and being of smaller diameter than same, the second discoid means having at least a part of its outer periphery forming an inner boundary of a channel for receiving the supplied bodies in alignment, the first discoid means forming a bottom boundary for said channel; stationary wall means forming the outer boundary for said channel, the radial width of the channel, which is defined by the distance between the outer periphery of said second discoid means and the stationary wall means, is adapted to the configuration of the bodies to be aligned such that only one body can be accommodated by the channel over the width of the channel, said wall means defining the outside of the channel and comprising a plurality of wall portions which are arranged in succession in the peripheral direction of the channel, and further including mounting means adapted at least in the region in which the periphery of the second discoid means forms the inner boundary of the channel to adjustably mount said wall portions substantially in a direction towards and away from the center of the drum, thereby to provide for adaptation of the radial width of the channel to the bodies to be aligned; means for rotating the first and second discoid means independently of each other; a stripper means disposed above said channel and operative to urge towards the interior of the drum any body disposed in the region of the channel and above a body in the channel, without however removing bodies which occupy their correct position within the channel; and a second stationary wall means located downstream of said stripper means in the direction of transportation of said bodies in said channel, the second stationary wall means delimiting a portion of said channel on the inward side thereof thereby to shield said portion of the channel relative to the interior of the drum, whereby the aligned bodies in the channel are guided out of the drum by way of at least a part of said shielded portion of the channel.

* * * * *